No. 826,077. PATENTED JULY 17, 1906.
G. W. WOOD.
WIRE STRAIGHTENING AND CUTTING MACHINE.
APPLICATION FILED SEPT. 6, 1905.
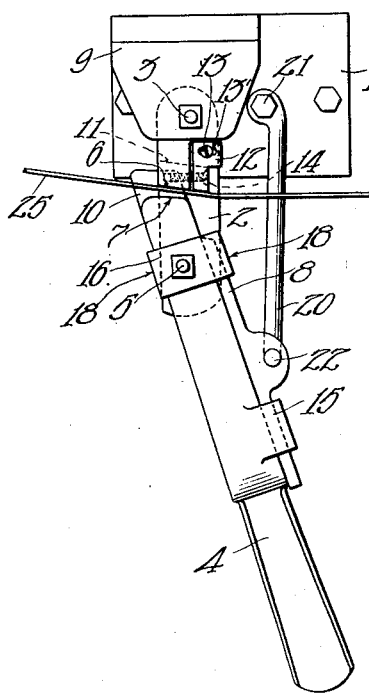
Witnesses
J. Mansfield
Verna A. Talbert
Inventor
George W. Wood
By Townsend, Lynn, Hackley & Knight
Attorneys.

UNITED STATES PATENT OFFICE.

GEORGE W. WOOD, OF NESTOR, CALIFORNIA, ASSIGNOR OF ONE-HALF TO MAYHEW A. VINCENT, OF SAN DIEGO, CALIFORNIA.

WIRE STRAIGHTENING AND CUTTING MACHINE.

No. 826,077.   Specification of Letters Patent.   Patented July 17, 1906.

Application filed September 6, 1905. Serial No. 277,162.

*To all whom it may concern:*

Be it known that I, GEORGE W. WOOD, a citizen of the United States, residing at Nestor, in the county of San Diego and State of California, have invented a new and useful Wire Straightening and Cutting Machine, of which the following is a specification.

The main object of the invention is to provide a machine for straightening baling-wire and cutting the wire to lengths.

A further object of the invention is to provide a machine for this purpose which will perform both the straightening and cutting operation by a single movement of the operating-handle.

The accompanying drawings illustrate the invention.

Figure 1 is a plan of the machine in position to operate on the wire. Fig. 2 is a plan of the machine in operated position. Fig. 3 is a side elevation, partly in section, on line $x^3 x^3$, Fig. 2.

The machine comprises a base 1, provided with means for bolting or clamping to a suitable support a lever member 2, pivotally mounted at 3 on said base, a handle member 4, pivoted at 5 on said lever member 2, said members 2 and 4 being provided with wire-clamping jaws or shoulders 6 7, a cutter 8, slidably mounted on the handle member 4, and means for causing longitudinal movement of said cutter on said handle member on the pivotal movement of said member. Lever member 2 is pivoted between the base 1 and a bracket 9 on said base, the pivots 3 5 of the lever 2 and arm 4 consisting, preferably, of detachable bolts, as shown. Handle member 4 has an end projection 10, extending beyond the shoulder 7 thereof and working in a slot or recess 11 in the lever member 2 to more effectually guide the members against lateral displacement and forming a bearing on which the wire may be placed when inserting it between the clamp-jaws 6 7.

A removable and adjustable cutter 12 may be fastened by set-screw 13 and adjusting-screw 14 to the lever member 2 alongside of jaw 6 to coöperate with the sliding cutter 8. Said sliding cutter is movable longitudinally of the handle member in guides 15 16, guide 15 being cast or integrally formed on the handle member, the guide 16 being formed of a bar removably secured on the handle member by the pivot-bolt 5 and having down-turned ends 18, one of which engages with the outer side of the handle member and the other engages over and forms a guide for the sliding cutter 8. Said sliding cutter is connected to the base 1 by a link 20, pivoted at 21 to said base and at 22 to the sliding cutter, so that pivotal movement of the parts on the main pivot 3 will cause movement of the cutter longitudinally inward or downward along the handle member. Set-screw or fastening-screw 13 engages in a slot 13' in cutter 12, so that said cutter may be moved toward or from the fixed jaw part 6 by adjusting-screw 14 and may then be clamped by set-screw 13.

The operation is as follows: A wire (indicated at 25 in Fig. 1) is assumed to have been previously looped at the end and attached to a suitable support, for example, the looping device or member indicated at 26. The handle is moved to position toward the right in said figure, this movement tilting or swinging the handle member 4 on the lever or carrier member 2 in such manner as to open or separate the gripping-jaws 6 7. The wire is then inserted between said jaws and the handle pulled toward the left, thereby first causing the handle member 4 to turn or swing on the carrier member 2 in such manner as to move the shoulders or jaws 6 7 toward one another to grip the wire between them, and then on further movement of the handle member in the same direction the said handle member, the lever 2, and the gripped wire will all move together and the wire will thereby be tautened and straightened. As the handle member moves in this manner the cutter-slide 8 is moved inwardly along the handle member by the action of the link 20, and at or toward the completion of the movement said cutter reaches the wire, and the latter is cut between said cutter and the fixed cutter 12. The wire having been straightened before it is cut it will then fall without curling or twisting up, as would otherwise be the case. In working with different sizes of wire it will be necessary to adjust the cutter 12 in or out toward the clamping-jaw, so as to always bring it in line with the cutting edge 8' with the movable cutter 8. Thus in the case of a smaller wire the handle member 4 will be tilted during the gripping operation in such manner that the cutting edge 8' will move in a direction farther from the jaw 6 than would be the case with a larger wire and the position of the adjustable cutter must be shifted accordingly.

What I claim is—

1. A wire straightening and cutting machine comprising a support, a lever member pivoted thereon, an operating member pivoted on the lever, said members being provided with wire-gripping jaws and with cutters, and means for operating one of said cutters in the pivotal movement of the members.

2. A wire straightening and cutting machine comprising a support, a lever member pivoted thereon, an operating member pivoted on said lever member, said members being provided with wire-gripping jaws, a cutter slidable on said operating member, a link connected to said cutter and to the support, and a cutter mounted on the lever member.

3. A wire straightening and cutting machine comprising a support, a lever member pivoted thereon, an operating member pivoted on said lever member, said members being provided with wire-gripping jaws, a cutter slidable on said operating member, a link connected to said cutter and to the support, and a cutter mounted on the lever member and provided with adjusting means to adjust its position relatively to the other cutter.

In testimony whereof I have hereunto set my hand, at San Diego, California, this 29th day of August, 1905.

GEORGE W. WOOD.

In presence of—
W. J. MOSSHOLDER,
DELIA A. SEVERIN.